3,130,081
Patented Apr. 21, 1964

3,130,081
LIMITED STABILITY AMYLOSE DISPERSIONS AND METHOD OF PREPARATION
Raymond B. Evans, Catonsville, Md., assignor to National Starch and Chemical Corporation, New York, N.Y., a corporation of Delaware
No Drawing. Filed Dec. 23, 1960, Ser. No. 77,801
3 Claims. (Cl. 127—33)

This invention relates to a method for preparing amylose dispersions of limited stability and to the dispersions thus produced. More particularly, this invention relates to a method of making dispersions of amylose having limited stability in the pH range at which amylose is normally insoluble.

It is the prime object of this invention to provide a method for stabilizing aqueous amylose dispersions so as to prevent their premature gelling or precipitation. Another object of this invention is to provide a novel method for the preparation of amylose derivatives which may be used in various applications including their conversion into edible, water soluble films. Additional objects involve the use of these stabilized amylose dispersions as adhesives and sizes.

It is well known that starch is composed of two fractions, the molecular arrangement of one being linear and the other being branched. The linear fraction of starch is known as amylose, and the branched fraction as amylopectin. Methods for separating starch into these two components are known. Starches from different sources (e.g. potato, corn, waxy maize, tapioca, etc.) are characterized by different relative proportions of the amylose and amylopectin components. Some starches have been genetically developed which are characterized by a large preponderance of the one fraction over the other.

There is at present no starch commercially available in original granular form which contains more than about 30% of amylose, although starch types with higher amylose contents may subsequently become available. When I use the term "amylose," for the purposes of this invention, I refer to the amylose resulting from the fractionation of the amylose and amylopectin components of starch, or to whole starch which is composed of at least 50% amylose. The latter, because of its high amylose content, offers the advantages and presents the problems (solved by this invention) found in substantially pure amylose.

Ordinary starch (that is, starch derived from corn, tapioca, potato, sago and similar plant forms, and containing from about 17–34% amylose) may be dispersed quite easily in water, merely by heating. Heating the aqueous suspension of the starch causes the individual granules to swell until the internal organization of each granule is destroyed (this being the well known phenomenon of gelatinization), and a hydrated colloidal dispersion of the starch is thus obtained. In the case of amylose, however, mere cooking in water will not succeed in effecting its complete dispersal. In order to form a dispersion it is necessary to heat the amylose in water, at low concentrations, under super-atmospheric pressure (about 75 lb. gauge pressure) in an autoclave. However, this dispersion is quite unstable in the sense that it rapidly forms a solid gel upon cooling. It is seen therefore that the method of dispersing amylose under pressure suffers from at least two disadvantages, namely, the need for specialized pressure equipment and the poor viscosity stability of the resultant dispersions.

Certain chemicals, particularly strong amines and strong caustic solutions, are known to be dispersants for amylose. However, the use of these reagents is again unsatisfactory since the resulting dispersions will ordinarily thicken almost immediately as soon as any attempt is made to effect their neutralization. The inability of these amylose dispersions, as prepared with concentrated alkali or other reagents, to retain their stability following neutralization obviously limits their utility. Any attempt, therefore, to employ such highly alkaline dispersions as adhesives or sizes would be rather difficult, if not impossible. Moreover, the possibility of using these dispersions as reaction media for the conversion of the amylose into various etherified or esterified derivatives is also decidedly limited. Thus, although some amylose ethers may be prepared in such a highly alkaline system, the preparation of amylose esters is completely precluded as they require relatively mild alkaline conditions for their successful derivatization. Such derivatives are rather useful to the practitioner since they display properties which facilitate their conversion to various forms such as unsupported films. For instance, the acetate esters of amylose having an acetyl content within a certain range are readily water soluble in contrast to the behaviour of the underivatized amylose base. These acetate esters may thus be employed in the preparation of edible, water soluble films which find extensive application in the packaging field. Heretofore, in preparing such amylose derivatives it has usually been the practice in the art to work with organic solvent solutions of amylose, thereby encountering all of the attendant hazards and costs involved in solvent handling and recovery.

I have now discovered a process for preparing aqueous amylose dispersions having limited stability under neutralization or acidification conditions wherein amylose is normally insoluble. By virtue of their limited stability it is possible for these dispersions to be employed as adhesives and sizes. Of greater importance is the fact that all types of derivatization reactions may be conducted with these aqueous amylose dispersions thereby making it possible for the practitioner to produce amylose esters as well as ethers, many of which may be readily converted into water soluble, self-supporting films.

In brief, the process of my invention involves the novel step of dispersing the amylose in an aqueous solution containing an excess amount of alkali whereupon the pH of this dispersion is then lowered to the desired range by the addition of acid. Surprisingly, the acidified or neutralized dispersions produced in this manner have been found to retain their stability for varying periods depending, of course, upon such diverse factors as the temperature of the dispersion and the respective concentrations of the amylose and the alkali. It must be emphasized, however, that these limited stability dispersions which are capable of subsequent neutralization can be produced only when the amount of alkali used to disperse the amylose substantially exceeds the quantity which is ordinarily employed for this purpose. Thus, I have noted that it is necessary to use at least a 4%, by weight, aqueous alkali solution in the process of my invention whereas it has heretofore been the practice in the art to attempt the preparation of amylose dispersions using alkali in concentrations which have rarely exceeded 2–3%, by weight. Such dispersions will, of course, precipitate as soon as any attempt is made to effect their neutralization or acidification.

The alkalies which can be utilized in my process may be selected from the group of alkali metal hydroxides; although, I prefer to employ sodium hydroxide for this purpose. As has already been noted, it is necessary to use at least a 4%, by weight, aqueous solution; however, for most applications, particularly any subsequent derivatization reactions, the use of a 5% alkali solution has been found to be optimal. As for the maximum quantity of alkali for use in my process, I have found that a 10%, by weight, solution provides an upper limit for most practical purposes.

The concentration range for the amount of amylose which may be dispersed by means of my process may be varied, in terms of an amylose: water ratio, from about 1:5 to 1:20. Optimum conditions for subsequent derivatization reactions require a ratio of 1:6 or 1:7 at an alkali concentration of 5%, by weight. Although dilutions higher than 1:20 can possibly be utilized, the large volumes of water involved would tend to render such conditions impractical.

In acidifying the alkaline amylose dispersions, the practitioner may use either hydrochloric or nitric acids as well as any water soluble organic acids such as acetic, propionic, succinic and oxalic acids. The use of nitric acid is preferred since it appears to provide dispersions displaying the highest degree of stability. The amount of acid which is used may be varied so as to adjust the pH of the amylose dispersion to any value within the range of from 2–9, the selected pH depending upon the particular application to which the dispersion is put.

With respect to the temperature at which my process is carried out, temperatures of from about 90–180° may be utilized although a range of from 100–130° F. appears to produce superior dispersions. It should be emphasized that the temperature used is dependent upon the various process factors, particularly the alkali concentration and the amylose:water ratio. Thus, the use of higher temperatures may cause degradation of the amylose, especially at high alkali concentrations. On the other hand, higher concentrations of amylose require the use of higher temperatures so as to help avoid premature retrogradation. Another factor to be considered is the potential end use of the dispersion. Thus, if the dispersion is to be employed as a sizing or adhesive, longer stability times would be desirable and such dispersions would probably be prepared and maintained at higher temperatures, i.e. above 150° F. In contrast, the preparation of derivatives ordinarily requires only 5–10 minutes in order to get the reaction under way and lower temperatures, in the order of from 90–140° F, may therefore be employed.

In preparing derivatives from these limited stability amylose dispersions, the practitioner is able to employ relatively mild reaction conditions on either the alkaline or acid side. Various amylose ethers and esters may thus be made at relatively low cost and in an aqueous system which is devoid of the problems associated with the use of the organic solvents which are ordinarily employed as reaction media for the preparation of amylose derivatives. These amylose derivatives display rather interesting properties. Thus, within a certain range of substitution, these derivatives are water dispersible and may be cast in self-supporting films which are themselves water dispersible and, in certain cases, completely edible.

The actual mechanics involved in the derivatization of my limited stability amylose dispersions involves the addition of the respective esterification or etherification reagent to the dispersion whose pH has previously been brought to the level best suited for the particular reaction. The pH may be maintained at this level during the reaction by the simultaneous addition of either acid or alkali. At the completion of the reaction the pH of the dispersion may then be readjusted to a more appropriate level. The dispersion of the amylose derivative may then be purified so as to remove any residual salts, preferably by dialysis, or by various other methods such as precipitation with water soluble solvents such as methanol. Where purification is effected by means of dialysis, the purified dispersion may be concentrated by evaporation and then cast into films. Where precipitation techniques are employed, the purified derivative may be redispersed in water and similarly cast into film form. Among the various derivatives which can be prepared with my limited stability amylose dispersions are the acetate, propionate, butyrate and isobutyrate esters as well as the cyanoethyl, hydroxyethyl, methyl, benzyl, hydroxypropyl and allyl ethers.

The films which may be prepared from these amylose derivatives may be used in a wide variety of applications. They possess high tensile strength and are clear, glossy and flexible even when prepared without the use of plasticizers. Those films made from amylose derivatives which are highly substituted (e.g in the case of acetate esters, an acetyl content of at least 2% and no more than 20%, by weight, is necessary) are particularly interesting in that they are completely water soluble and may thus be employed for the packaging of individual portions of such materials as soaps, dyes, bleaches and detergents. Moreover, films derived from the acetate and propionate esters of amylose are completely edible and digestible in addition to being water soluble. Such films may thus be used to package food products so as to provide completely edible units.

Although excellent films can be prepared from these derivatives without the use of any plasticizers, the practitioner can, if desired, introduce up to about 10%, by weight, of a suitable plasticizer. Applicable plasticizers, particularly for food packaging films, include such materials as glycerol, the various sorbitols, sugars, sodium acetate, sodium chloride, propylene glycol and diethylene glycol.

The following examples will further illustrate the embodiment of my invention. In these examples all parts given are by weight unless otherwise noted.

*Example I*

This example illustrates the preparation of my limited stability amylose dispersions using lithium hydroxide as the alkali.

With stirring, 40 parts of amylose were added to 280 parts of water containing 25.6 parts of lithium hydroxide monohydrate dissolved therein (i.e. a 5.3%, by weight, LiOH solution). After the amylose had been dispersed, the resulting mixture was heated to a temperature of 130° F and acidified to a pH in the range 5.0–5.5 by the addition of 60 parts of 20° Bé. HCl. The dispersion was then heated to a temperature of 160° F. and when held at this temperature it remained fluid and clear for over 1½ hours.

*Example II*

This example illustrates the use of the lower limit of alkali (i.e. 4%, by weight) in the preparation of my limited stability amylose dispersions. It also illustrates the poor results which are obtained when this critical lower limit is not met.

With stirring, 30 parts of amylose were added to 300 parts of water containing 12 parts of sodium hydroxide dissolved therein. The mixture was heated to the range of from 150–180° F. and acidified to a pH of 6.0 by the addition of 32 parts of 20° Bé. HCl. The dispersion was then heated to 190° F. and remained fluid and clear after 1½ hours. Samples of this dispersion were successfully employed in the sizing of cotton warp yarns.

In contrast, when the above procedure was repeated with the exception, in this case, that only 6 parts of sodium hydroxide were used (i.e. a 2%, by weight, solution), the addition of the HCl resulted in an immediate thickening of the amylose dispersion even before it was brought to the acid side. This product could not, of course, be used as a size.

*Example III*

This example illustrates the use of the upper limit of alkali (i.e. 10%, by weight) in the preparation of my limited stability amylose dispersions.

With stirring, 300 parts of amylose were added to 3300 parts of a 10%, by weight, aqueous NaOH solution which was at a temperature of 100° F. This dispersion was then brought to a pH of 5.5 by the addition of concentrated HCl. Its temperature was thereupon raised to 120° F.

and it was maintained in a stable state for 1¾ hours before it slowly began to thicken.

*Example IV*

This example illustrates the use of a high concentration of amylose (i.e. a 1:6 amylose:water ratio) in the preparation of my limited stability amylose dispersions.

With stirring, 40 parts of amylose were added to 240 parts of water containing 12 parts of NaOH dissolved therein and which was at a temperature of 120° F. The mixture was then heated to 150° F. whereupon 32 parts of 20° Bé. HCl were added so as to lower the pH to a value of 6.0. The resulting dispersion maintained its stability for about 20 minutes.

*Example V*

This example illustrates the use of a low concentration of amylose (i.e. 1:20 amylose:water ratio) in the preparation of my limited stability amylose dispersions.

With stirring, 15 parts of amylose were added to 300 parts of water containing 15 parts of NaOH dissolved therein and which was at a temperature of 70° F. This mixture was acidified to a pH of 4.5 by the addition of concentrated CHl. The resulting dispersion remained stable for one hour at a temperature of 80° F.

*Example VI*

This example illustrates the use of a high amylose corn starch in the process of my invention.

With stirring, 40 parts of a high amylose corn starch having an amylose content of 55%, by weight, were added to 280 parts of water containing 11.2 parts of NaOH dissolved therein and which was at a temperature of 100° F. This mixture was acidified to a pH of 6.2 by the addition of 20° Bé. HCl. When raised to a temperature of 120° F., this dispersion remained fluid for over 1½ hours.

*Example VII*

This example illustrates the use of nitric acid in the preparation of my limited stability amylose dispersions.

With stirring, 40 parts of amylose were added to 280 parts of water containing 14.8 parts of NaOH dissolved therein and which was at a temperature of 100° F. This mixture was acidified to a pH of 5.6 by the addition of 55 parts of a 1:1 mixture of nitric acid and water. When raised to a temperature of 120° F., this dispersion maintained its stability for 20 minutes.

*Example VIII*

This example illustrates the use of acetic acid in the preparation of my limited stability amylose dispersions.

With stirring, 40 parts of amylose were added to 280 parts of water containing 14.8 parts of NaOH dissolved therein and which was at a temperature of 100° F. This mixture was acidified to a pH of 5.5 by the addition of 25 parts of glacial acetic acid. When raised to a temperature of 120° F., this dispersion maintained its stability for 7 minutes.

*Example IX*

This example illustrates the acetylation of my limited stability amylose dispersions along with the subsequent conversion of the resulting acetate esters into self-supporting films.

With stirring, 40 parts of amylose were added to 240 parts of a 5%, by weight, aqueous LiOH solution which was at a temperature of 120° F. The temperature of this mixture was raised to 130° F. and it was acidified to a pH of 8.0 by the addition thereto of 50 parts of 20° Bé. HCl. Six parts of acetic anhydride were then slowly added to the resulting dispersion while its pH was maintained between 7.5–8.5 and its temperature at 150° F. The pH was maintained at this level by the simultaneous addition, as needed, of a 20%, by weight, aqueous LiOH solution. After the addition of the acetic anhydride was complete, the pH of the mixture was kept between 7.2–7.5 for 5 minutes and was then lowered to a value of 6.0 by the addition of glacial acetic acid. The amylose acetate produced in this manner had an acetyl content of 3.8%, by weight.

The resulting amylose acetate solution was purified by being placed in dialyzing cellophane tubing and dialyzed against running water for 10 hours. It was then concentrated by evaporation under reduced pressure. This solution was then cast into films which when dried and removed from their casting surfaces were found to be flexible, clear and exceedingly tough. At a relative humidity of 60% they displayed a tensile strength in the order of 8,000 p.s.i. and an elongation of about 10%. Moreover, these films were cold water soluble and were also edible.

*Example X*

This example illustrates the propylation of my limited stability amylose dispersions along with the subsequent conversion of the resulting propionate esters into self-supporting films.

With stirring, 70 parts of amylose were added to 420 parts of water containing 21 parts of NaOH dissolved therein. The temperature of this mixture was raised to 130° F. and it was acidified to a pH of 8.0 by the addition of 20° Bé. HCl. While the pH of this dispersion was being held between 7.0–8.0 by the simultaneous addition of a 20%, by weight, aqueous NaOH solution, 10.5 parts of propionic anhydride were slowly added. The resulting amylose propionate solution was then purified by means of the dialysis procedure described in Example IX. It was then concentrated by evaporation under reduced pressure. The propionyl content of this product was 3.45%. When cast this propionate ester provided clear, transparent, flexible films of high strength and good humidity resistance characteristics. These films were also cold water soluble and edible.

*Example XI*

This example illustrates the cyanoethylation of my limited stability amylose dispersions.

With stirring, 70 parts of amylose were added to 420 parts of water containing 21 parts of NaOH dissolved therein. The temperature of this mixture was raised to 130° F. and it was acidified to a pH of 10.2 by the addition of 50 ml. of 20° Bé. Cl whereupon its temperature rose to 150° F. With stirring, 10.5 parts of acrylonitrile were added with stirring being continued for 4 hours during which time the temperature dropped to about 120° F.

The resulting cyanoethyl amylose ether was purified by precipitation with an excess of ethanol yielding a product which was readily soluble in water.

*Example XII*

This example illustrates the hydroxyethylation of my limited stability amylose dispersions.

With stirring, 80 parts of amylose were added to 504 parts of a 5%, by weight, aqueous NaOH solution which was at a temperature of 130° F. The mixture was acidified to a pH of 10 by the addition of concentrated HCl and its temperature raised to 160° F. whereupon 12 parts of ethylene chlorohydrin were added. The reaction was continued for 1¼ hours at 160° F. with the pH being maintained between 9.5 and 10.0 by the addition of portions of a 20%, by weight, NaOH solution. The resulting hydroxyethyl amylose ether solution was next acidified and dialyzed according to the procedure described in Example IX. The product was then precipitated with ethanol and finally dried.

Summarizing, my invention is thus seen to provide the practitioner with an efficient procedure for use in the preparation of aqueous amylose dispersions having limited stability under conditions in which similar dispersions will ordinarily precipitate or gel. My dispersions are particularly useful for the preparation of amylose derivatives which may subsequently be converted into film form. Variations may be made in materials, procedures and proportions without departing from the scope of this invention which is limited only by the following claims.

I claim:

1. A method for preparing aqueous amylose dispersions which comprises admixing amylose with an aqueous alkali solution having an alkali concentration within the range 4% to 10%, the weight ratio of amylose to water being within the range of the order of 1:5 to 1:20, said admixture being conducted at a temperature within the range 90–180° F., and then acidifying the resulting dispersion with an acid selected from the class consisting of hydrochloric, nitric, acetic, propionic, succinic and oxalic acids, to a pH within the range 2 to 9.

2. The method of claim 1, wherein said alkali is selected from the class of alkali metal hydroxides.

3. An aqueous amylose dispersion prepared by the acidification to a pH within the range 2 to 9 of a composition comprising amylose admixed, at a temperature within the range 90°–180° F., with an aqueous alkali solution having an alkali concentration within the range 4% to 10% by weight, the weight ratio of amylose to water in said dispersion being within the range of the order of 1:5 to 1:20, and the acid employed in said acidification being selected from the class consisting of hydrochloric, nitric, acetic, propionic, succinic and oxalic acids.

References Cited in the file of this patent

UNITED STATES PATENTS

| | | |
|---|---|---|
| 2,373,016 | Daly et al. | Apr. 3, 1945 |
| 2,599,620 | Filbert | June 10, 1952 |
| 2,733,238 | Kerr et al. | Jan. 31, 1956 |
| 2,805,220 | Gerwitz | Sept. 3, 1957 |
| 2,822,581 | Muetgeert et al. | Feb. 11, 1958 |
| 3,038,895 | Rutenberg et al. | June 12, 1962 |
| 3,049,538 | Brobst | Aug. 14, 1962 |
| 3,051,700 | Elizer et al. | Aug. 28, 1962 |

FOREIGN PATENTS

| | | |
|---|---|---|
| 770,089 | Great Britain | Mar. 13, 1957 |

OTHER REFERENCES

Wolff et al.: "Industrial and Engineering Chemistry, vol. 43, January-April 1951, pages 911–919, 260–233.3, Amylose Digest.

Kaplan: "Cereal Science Today," vol. 3, No. 8, October 1958, pages 206–209, 260–233.3, Amylose Digest. (Copy in Scientific Library.)